United States Patent [19]

Pollock et al.

[11] Patent Number: 4,942,005

[45] Date of Patent: Jul. 17, 1990

[54] METHOD OF MAKING A SHAPED POLYESTER ARTICLE

[75] Inventors: Mark A. Pollock, Johnson City; William J. Stowell; James J. Krutak, both of Kingsport, all of Tenn.

[73] Assignee: Eastman Kodak Company, Rochester, N.Y.

[21] Appl. No.: 205,882

[22] Filed: Jun. 13, 1988

Related U.S. Application Data

[62] Division of Ser. No. 47,821, May 5, 1987, Pat. No. 4,770,931.

[51] Int. Cl.$^5$ ............ B29C 41/30; B29C 47/02; B29C 49/08; B32B 3/26
[52] U.S. Cl. ............ 264/45.3; 264/210.6; 264/210.7; 264/210.8; 264/211; 264/216; 264/288.8; 264/290.2; 264/290.5; 264/537; 264/540; 264/DIG. 47
[58] Field of Search ............ 264/45.3, 41, 210.6, 264/210.7, 210.8, 211, 288.8, 290.2, 537, 540, DIG. 47, 290.5, 216; 428/304.4

[56] References Cited

U.S. PATENT DOCUMENTS

| | | |
|---|---|---|
| 3,154,461 | 10/1964 | Johnson . |
| 3,630,990 | 12/1971 | Neal . |
| 3,640,944 | 2/1972 | Seppala et al. ............ 268/48 |
| 3,697,367 | 10/1972 | Schwarz . |
| 3,701,701 | 10/1972 | Sogi ............ 186/229 |
| 3,755,499 | 8/1973 | Heijo et al. . |
| 3,795,720 | 3/1974 | Schwarz ............ 264/41 |
| 3,903,234 | 9/1975 | Ikeda et al. . |
| 3,944,699 | 3/1976 | Mathews et al. ............ 428/220 |
| 4,128,689 | 12/1978 | Heaps et al. ............ 428/311 |
| 4,187,113 | 2/1980 | Mathews ............ 430/533 |
| 4,318,950 | 3/1982 | Takashi ............ 428/143 |
| 4,320,207 | 3/1982 | Watanabe et al. ............ 521/54 |
| 4,340,639 | 7/1982 | Toyoda et al. ............ 428/338 |
| 4,377,616 | 3/1983 | Ashcraft et al. ............ 428/213 |
| 4,438,175 | 3/1984 | Ashcraft et al. ............ 428/315.5 |
| 4,518,744 | 5/1985 | Brody ............ 525/184 |
| 4,560,614 | 12/1985 | Park ............ 428/317.9 |
| 4,596,738 | 6/1986 | Metcalfe et al. ............ 428/308.4 |
| 4,770,931 | 9/1988 | Pollock et al. ............ 428/304.4 |
| 4,780,402 | 10/1988 | Remmington . |

FOREIGN PATENT DOCUMENTS 1563591 3/1980 United Kingdom .
1563592 3/1980 United Kingdom .

*Primary Examiner*—Jeffery Thurlow
*Attorney, Agent, or Firm*—John F. Stevens; William P. Heath, Jr.

[57] ABSTRACT

Disclosed is a method of making shaped articles including a continuous polyester phase having dispersed therein microbeads of cellulose acetate which are at least partially bordered by void space, the microbeads of cellulose acetate being present in an amount of about 10–30% by weight based on the weight of said polyester, said void space occupying about 2–50% by volume of said shaped article. Articles made by this method have excellent physical properties, especially optical properties, and are useful in such applications as paper substitutes, for example.

6 Claims, 5 Drawing Sheets

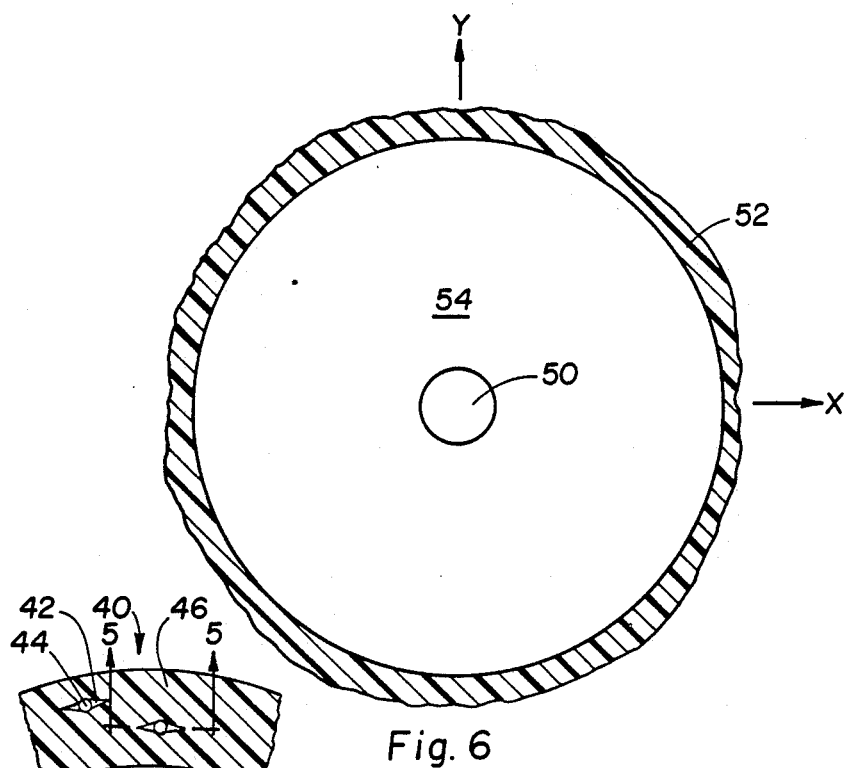
Fig. 6
Fig. 4
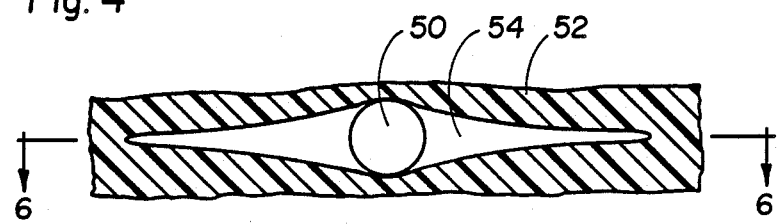
Fig. 5
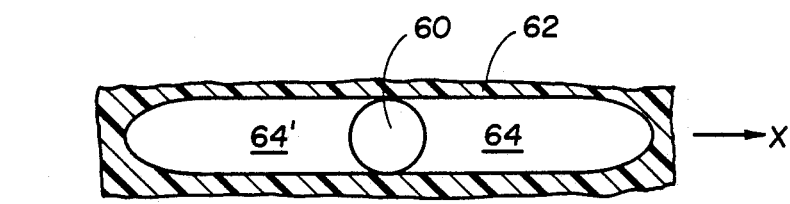
Fig. 7

METHOD OF MAKING A SHAPED POLYESTER ARTICLE

This is a divisional of application Ser. No. 047,821 filed on May 5, 1987 now U.S. Pat. No. 4,770,931.

TECHNICAL FIELD

The present invention is directed to shaped articles such as films, sheets, bottles, tubes, fibers and rods having a polyester continuous phase containing cellulose ester microbeads dispersed therein which are at least partially bordered by voids. The articles have unique properties of texture, opaqueness, whiteness in the absence of colorants, and generally good physical properties such as tensile properties.

BACKGROUND OF THE INVENTION

Blends of linear polyesters with other incompatible materials of organic or inorganic nature to form microvoided structures are well-known in the art. U.S. Pat. No. 3,154,461 discloses, for example, the linear polyester, poly(ethylene terephthalate), blended with, for example, calcium carbonate. U.S. Pat. No. 3,944,699 discloses blends of linear polyester, preferably poly(ethylene terephthalate) with 3 to 27% of organic material such as ethylene or propylene polymer. U.S. Pat. No. 3,640,944 also discloses the use of poly(ethylene terephthalate) but blended with 8% organic material such as polysulfone or poly(4-methyl,1-pentene). U.S. Pat. No. 4,377,616 discloses a blend of polypropylene to serve as the matrix with a small percentage of another and incompatible organic material, nylon, to initiate microvoiding in the polypropylene matrix. U.K. Patent Specification 1,563,591 discloses linear polyester polymers, and particularly poly(ethylene terephthalate), for making an opaque thermoplastic film support in which have been blended finely divided particles of barium sulfate together with a void-promoting polyolefin, such as polyethylene, polypropylene and poly-4-methyl-1-pentene.

The above-mentioned patents show that it is known to use incompatible blends to form films having paper-like characteristics after such blends have been extruded into films and the films have been quenched, biaxially oriented and heat set. The minor component of the blend, due to its incompatibility with the major component of the blend, upon melt extrusion into film forms generally spherical particles each of which initiates a microvoid in the resulting matrix formed by the major component. The melting points of the void initiating particles, in the use of organic materials, should be above the glass transition temperature of the major component of the blend and particularly at the temperature of biaxial orientation.

As indicated in U.S. Pat. No. 4,377,616, spherical particles initiate voids of unusual regularity and orientation in a stratified relationship throughout the matrix material after biaxial orientation of the extruded film. Each void tends to be of like shape, not necessarily of like size since the size depends upon the size of the particle.

Ideally, each void assumes a shape defined by two opposed and edge contacting concave disks. In other words, the voids tend to have a lens-like or biconvex shape. The voids are oriented so that the two major dimensions are aligned in correspondence with the direction of orientation of the film structure. One major dimension is aligned with machine direction orientation, a second major dimension is aligned with the transverse direction orientation, and a minor dimension approximately corresponds to the cross-section dimension of the void-initiating particle.

The voids generally tend to be closed cells, and thus there is virtually no path open from one side of a biaxially oriented film to the other side through which liquid or gas can traverse.

Upon biaxial orientation of the resulting extruded film, the film becomes white and opaque, the opacity resulting from light being scattered from the walls of the microvoids. The transmission of light through the film becomes lessened with increased number and with increased size of the microvoids relative to the size of a particle within each microvoid.

Also, upon biaxial orientation, a matte finish on the surface of the film results, as discussed in U.S. Pat. No. 3,154,461. The particles adjacent the surfaces of the film tend to be incompressible and thus form projections without rupturing the surface. Such matte finishes enable the film to be written upon with pencil or with inks, crayons, and the like.

Although the films discussed so far generally white and opaque, suitable dyes may be used either in what will become the matrix polymer or in the void initiating particles. U.S. Pat. No. 4,377,616 points out that interesting effects can be achieved by the use of spheres of different colors or by the use of spheres of different color absorption or reflectance. The light scattered in a particular void may additionally either be absorbed or reflected by the void initiating sphere and a separate color contribution is made to the light scattering in each void.

U.S. Pat. No. 4,377,616 discloses that preferred particle size of a void initiating sphere may be about 0.1 to about 10 microns, and that preferred particle size range from about 0.75 to about 2 microns. U.S. Pat. No. 3,154,461 specifies that a range of sizes may be approximately 0.3 micron to approximately 20 microns, and that when calcium carbonate is used, its size may range from 1 to 5 microns.

U.S. Pat. No. 3,944,699, for example, indicates that the linear polyester component of the film may comprise any thermoplastic film forming polyester which may be produced by condensing one or more dicarboxylic acids or a lower alkyl diester thereof, such as terephthalic acid, isophthalic acid, 2,5-,2,6- or 2,7-naphthalene dicarboxylic acid, succinic acid, sebaric acid, adipic acid, azelaic acid, bibenzoic acid, and hexahydroterephthalic acid, or bis-p-carboxy phenoxy ethane, with one or more glycols. Such glycols may include ethylene glycol, 1,3-propanediol, 1,4-butanediol, neopentyl glycol, and 1,4-cyclohexanedimethanol. Also, a copolyester of any of the above-indicated materials may be used. The preferred polyester is poly(ethylene terephthalate).

U.S. Pat. No. 3,944,699 also indicates that the extrusion quenching and stretching of the film may be effected by any process which is known in the art for producing oriented film, such as by a flat film process or a bubble or tubular process. The flat film process involves extruding the blend through a slit dye and rapidly quenching the extruded web upon a chilled casting drum so that the polyester component of the film is quenched into the amorphous state. The quenched film is then biaxially oriented by stretching in mutually perpendicular directions at a temperature above the glass transition temperature of the polyester. The film may be stretched in one direction and then in a second direction or may be simultaneously stretched in both directions. After the film has been stretched it is heat set by heating to a temperature sufficient to crystallize the polyester while restraining the film against retraction in both directions of stretching.

Paper is essentially a non-woven sheet of more or less randomly arrayed fibers. The key properties of these structures are opacity, texture, strength, and stability. Obviously, fiber technology evolved synergistically with paper, and today we have a variety of synthetic fibers and synthetic papers. In both areas, however, the synthetic materials have never quite matched the cellulose-based natural polymers, like cotton for fibers and cellulose pulps for papers. On the other hand, the natural polymers are generally weaker and less stable. A serious problem, for example, is brightness reversion or fading of papers and fibers. The present invention advances the state of these prior arts.

Although there are many ways to produce opaque media, this invention is concerned with creating opacity by stretching or orienting plastic materials to induce microvoids which scatter light, preferable white light. A large body of prior art deals with this technique, wherein a plurality of inorganic solid particles are used as the dispersed phase, around which the microvoids form. Some significant problems associated with this approach are: (1) agglomeration and particle size control, (2) abrasive wear of extrusion equipment, guides, and cutters, (3) high specific gravity of these solids, (4) poor void nucleation around the solid particles due to the low thermal contraction of solids relative to liquids and polymer wetting and adhhesion to the solid surfaces, (5) cost of these materials on a volume basis, and (6) handling and processing problems in general. In every case, the invention reduces or eliminates the problem.

The prior art also teaches a variety of methods of creating surface texture. Often the surface is roughened by physical means like abrasion, crimping, etc. Many chemical methods are also used to react with, etch, or otherwise alter the surface. Flame, electrical corona, and electromagnetic radiations are often employed. Coating technology is well advanced for filling and whitening, and often inorganic materials are major components of these coatings. Even if the orientation or stretching step is eliminated, a coating step is required. Not only do most of the problems above remain, but new ones are created in such areas as adhesion, uniformity, and coating stability.

The cited prior art concentrates on synthetic paper compositions and methods of manufacturing directly related to this invention, namely compositions of matter involving polyesters and/or cellulose esters, stretching incompatible/immiscible thermoplastic blends to create voided structures with or without texture, and some of the properties and problems associated with the use of inorganic, non-melting materials. The blend compositions and processing methods of this invention constitute a significant improvement over the immiscible polymer blend systems found in the prior art.

DESCRIPTION OF THE DRAWINGS

In the drawings:

FIG. 4 is a section of a shaped article in the form of a bottle;

FIG. 5 is an enlarged section view illustrating a microbead of cellulose acetate entrapped in a void in a polyester continuous matrix;

FIG. 6 is a sectional view taken along lines 6—6 of FIG. 5;

FIG. 7 is a sectional view similar to FIG. 5 illustrating a modification of the present invention.

DESCRIPTION OF THE INVENTION

In accordance with the present invention, shaped articles are provided which have unique properties such as texture and opacity. The articles are especially useful when in the form of film or sheet material (e.g., as a paper substitute) or when in the form of a biaxially oriented bottle (beverage container).

Figure 1:
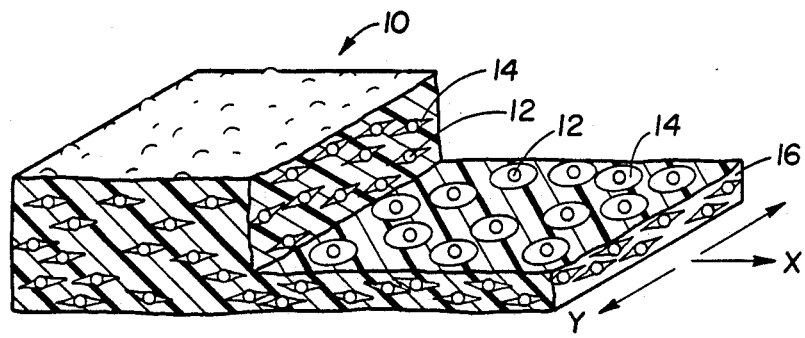
FIG. 1 is a perspective view in section illustrating an embodiment of the present invention.
Figure 9:
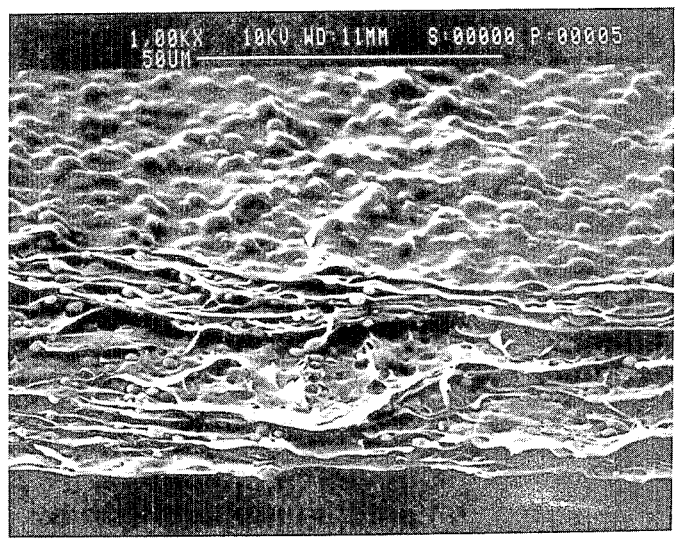
FIGS. 9, 10 and 11 are photomicrographs of film comprising a polyester continuous matrix, and cellulose ester microbeads at least partially bordered by voids.
Figure 10:
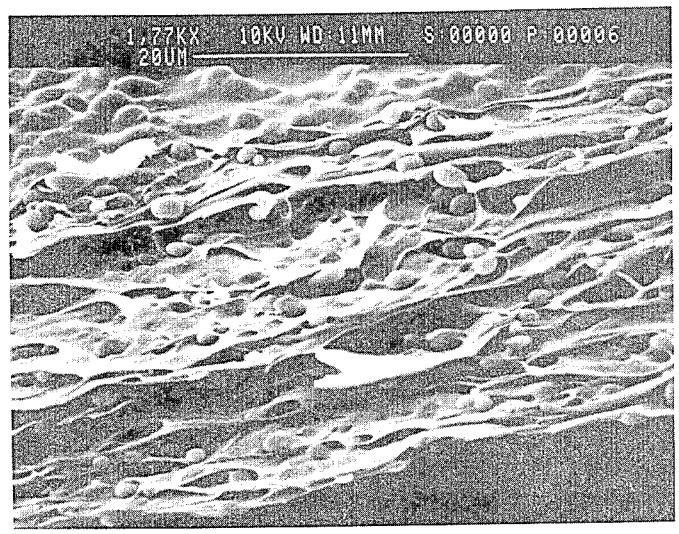
Figure 11:
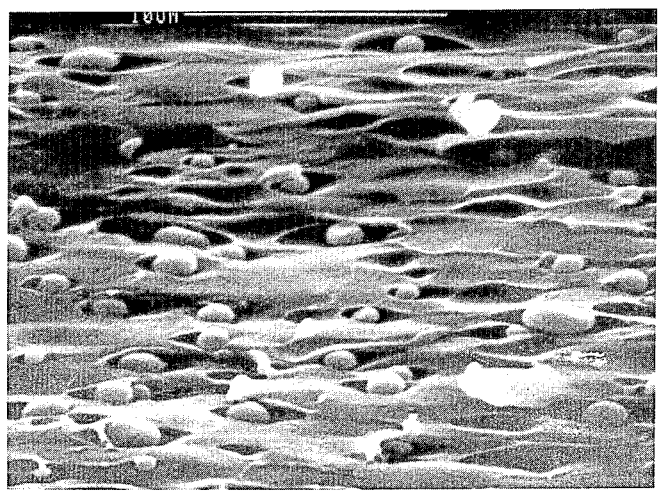

Referring to the drawings, FIG. 1 illustrates a shaped article in the form of a sheet 10 which has been biaxially oriented [biaxially stretched, i.e., stretched in both the longitudinal (X) and transverse (Y) directions], as indicated by the arrows. The sheet 10 is illustrated in section, showing microbeads of cellulose acetate 12 contained within circular voids 14 in the polyester continuous matrix 16. The voids 14 surrounding the microbeads 12 are theoretically doughnut-shaped, but are often of irregular shape. Sometimes two or more microbeads will be bordered by common voids, as illustrated in FIGS. 9, 10 and 11. Often, a line drawn perpendicular to and through the article will penetrate several voids and possibly some microbeads.

Figure 2:
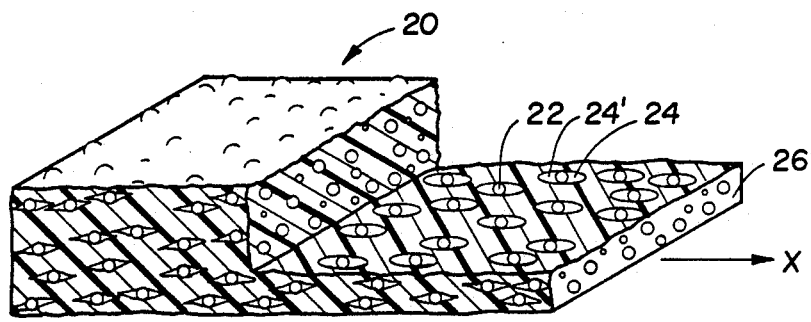
FIG. 2 is a perspective view in section illustrating another embodiment of the present invention.

FIG. 2 also illustrates a shaped article in the form of a sheet 20 which has been unidirectionally oriented (stretched in one direction only, as indicated by the arrow). Microbeads of cellulose acetate 22 are contained between microvoids 24 and 24'. The microvoids in this instance form at opposite sides of the microbeads as the sheet is stretched. Thus, if the stretching is done in the machine direction (X) as indicated by the arrow, the voids will form on the leading and trailing sides of the microbeads. This is because of the unidirectional orientation as opposed to the bidirectional orientation of the sheet shown in FIG. 1. This is the only difference between FIG. 1 and 2. Note particularly the bumpy texture of the surfaces.

Figure 3:
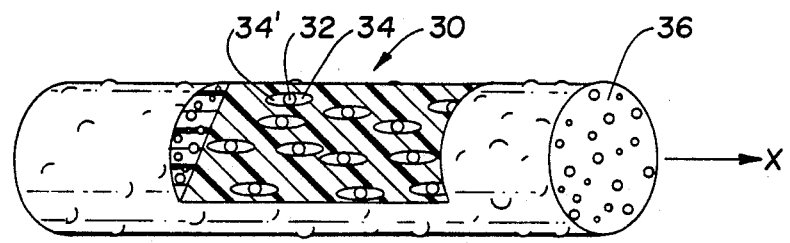
FIG. 3 is a perspective view illustrating still another embodiment of the present invention.

FIG. 3 illustrates a shaped article in the form of a fiber or rod 30 which has been oriented by stretching in the lengthwise (X) direction. The microbeads 32 of cellulose ester are bordered by microvoids 34 and 34.

FIG. 4 illustrates a section of the wall of a shaped article 40 such as a bottle or wire coating. Due to the bidirectional orientation or stretching, the microvoids 42 are generally doughnut-shaped, surrounding the microbeads 44, in a manner similar to that shown in FIG. 1.

FIGS. 5 and 6 are sectional views illustrating enlargement of a section of a shaped article according to this invention, microbead 50 being entrapped within polyester continuous matrix 52 and encircled by void 54. These structures result from the shaped article being stretched in the X and Y directions.

FIG. 7 is a view similar to FIG. 5, except illustrating in enlarged form microbead 60 entrapped in polyester continuouos matrix 62, having formed on opposite sides thereof microvoids 64 and 64', which are formed as the shaped article is stretched in the direction of the arrow X.

Figure 8:
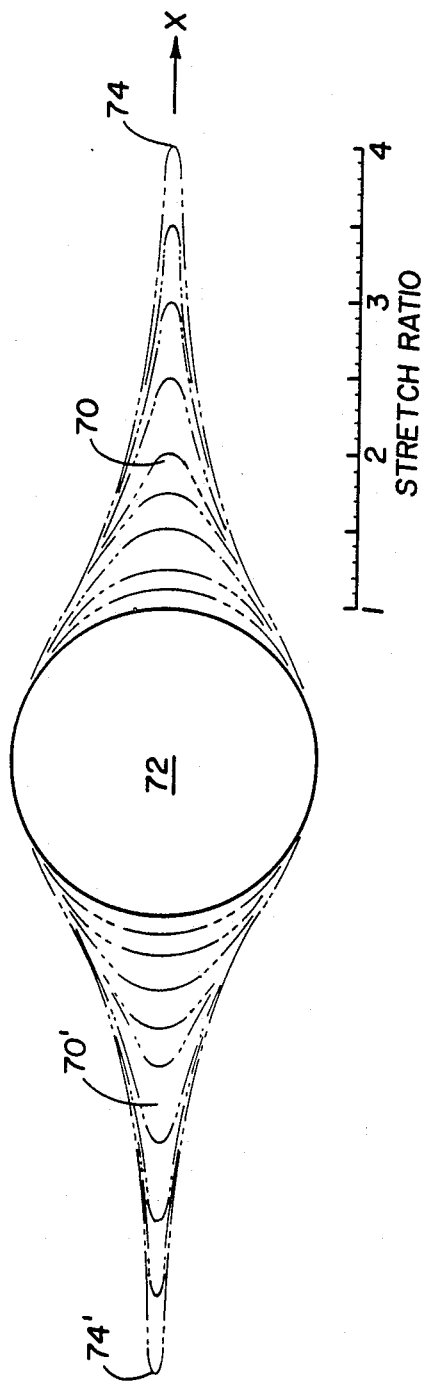
FIG. 8 is a graphical representation illustrating how the size of microbeads surrounding microbeads changes with respect to stretch ratio.

FIG. 8 is an enlargement illustrating the manner in which microvoids are formed in the polyester continuous matrix as the shaped article is stretched or oriented. The formation of the microvoids 70 and 70' around microbeads 72 is illustrated on a stretch ratio scale as the shaped article is stretched up to 4 times its original dimension. For example, as the article is stretched 4 times its original dimension in the X direction (4×), the voids 70 and 70' would extent to the points 74 and 74' respectively.

FIGS. 9 and 10 are actual photographs of sections of a sheet according to this invention which has been frozen and fractured. The continuous matrix, microbeads and voids are obvious. FIG. 11 is an actual photograph of a section of sheet material, oriented in one direction. The scale of these photomicrographs is indicated at the top of each in microns (um).

According to the present invention, there are provided shaped articles comprising a continuous thermoplastic polyester phase having dispersed therein microbeads of cellulose ester which are at least partially bordered by voids. The shaped articles are conveniently in the form of sheets or film, rods or fibers, bottles, wire coatings, etc. The polyester is relatively strong and tough, while the cellulose acetate is relatively hard and brittle.

More specifically, the present invention provides shaped articles comprising a continuous thermoplastic polyester phase having dispersed therein microbeads of cellulose ester which are at least partially bordered by voids, the microbeads of cellulose acetate being present in an amount of about 10-30% by weight based on the weight of polyester, the voids occupying about 2-50% by volume of the shaped article, the composition of the shaped article when consisting only of the polyester continuous phase and microbeads of cellulose ester bordered by voids characterized by having a Kubelka-Munk R value (infinite thickness) of about 0.90 to about 1.0 and the following Kubelka-Munk values when formed into a 3 mil thick film:

Opacity — about 0.78 to about 1.0
SX — 25 or less
KX — about 0.001 to 0.2
Ti — about 0.02 to 1.0 wherein the opacity values indicate that the article is opaque, the SX values indicate a large amount of light scattering through the thickness of the article, the KX values indicate a low amount of light absorption through the thickness of the article, and the Ti values indicate a low level amount of internal transmittance of the thickness of the article. The R (infinite thickness) values indicate a large amount of light reflectance.

Obviously, the Kubelka-Munk values which are dependent on thickness of the article must be speciified at a certain thickness. Although the shaped articles themselves may be very thin, e.g., less than 1 mil or they may be thicker, e.g., 20 mils, the Kubleka-Munk values, except for R infinity, are specified at 3 mils and in the absence of any additives which would effect optical properties. Thus, to determine whether shaped articles have the optical properties called for, the polyester containing microbeads at least partially bordered by voids, without additives, should be formed in a 3 mils thick film for determination of Kubleka-Munk values.

The shaped articles according to this invention are useful, for example, when in the forms of sheets of films, bottles, ribbons, fibers or rods, wire coatings, etc. In the absence of additives or colorants, they are very white, have a very pleasant feel or hand and very receptive to ink from writing instruments, especially conventional ball point pens. In fact, one of the most important uses contemplated for the present invention is as a synthetic paper for writing on or for prints such as drawings. The shaped articles are very resistant to wear, moisture, oil, tearing, etc.

The polyester (or copolyester) phase may be any article-forming polyester such as a polyester capable of being cast into a film or sheet, spun into fibers, extruded into rods or extrusion, blow-molded into containers such as bottles, etc. The polyesters should have a glass transition temperature between about 50° C. and about 150° C., preferably about 60°-100° C., should be orientable, and have an I.V. of at least 0.55, preferably 0.6 to 0.9. Suitable polyesters include those produced from aromatic, aliphatic or cycloaliphatic dicarboxylic acids of 4-20 carbon atoms and aliphatic or alicyclic glycols having from 2-24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, and mixtures thereof. Examples of suitable glycols include ethylene glycol, propylene glycol, butanediol, pentanediol, hexanediol, 1,4-cyclohexanedimethanol diethylene glycol and mixtures thereof. Such polyesters are well known in the art and may be produced by well-known techniques, e.g., those described in U.S. Pat. Nos. 2,465, 319 and 2,901,466. The preferred polyester is polyethylene terephthalate having a Tg of about 80° C. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607, 4,459,402 and 4,468,510.

Blends of polyesters and/or copolyesters are useful in the present invention. Also, small amounts of other polymers such as polyolefins can be tolerated in the continuous matrix.

Suitable cellulose acetates are those having an acetyl content of about 28 to 44.8% by weight, and a viscosity of about 0.01-90 seconds. Such cellulose acetates are well known in the art. Small contents of propionyl can usually be tolerated. Also, processes for preparing such celliulose acetates are well known in the art. Suitable commercially available cellulose acetates include the following which are marketed by Eastman Chemical Products, Inc.:

| Cellulose Acetate Type | Viscosity[1] Seconds | Viscosity[1] Poises | Acetyl Content %[2] | Hydroxyl Content %[2] | Melting Range °C. | Tg, °C. | Number Average Molecular Weight[3] |
| --- | --- | --- | --- | --- | --- | --- | --- |
| CA-394-60S | 60.0 | 228.0 | 39.5 | 4.0 | 240–260 | 186 | 60,000 |
| CA-398-3 | 3.0 | 11.4 | 39.8 | 3.5 | 230–250 | 180 | 30,000 |
| CA-398-6 | 6.0 | 22.8 | 39.8 | 3.5 | 230–250 | 182 | 35,000 |
| CA-398-10 | 10.0 | 38.0 | 39.8 | 3.5 | 230–250 | 185 | 40,000 |
| CA-398-30 | 30.0 | 114.0 | 39.7 | 3.5 | 230–250 | 189 | 50,000 |
| CA-320S | 0.05 | 0.2 | 32.0 | 8.4 | 190–269 | about 180–190 | about 18,000 |
| CA-436-80S | 80 | 304 | 43.7 | 0.82 | 269–300 | 180 | 102,000 |

[1]ASTM D817 (Formula A) and D1343
[2]ASTM D817
[3]Molecular weights are polystyrene equivalent molecular weights, using Gel Permeation Chromatography The microbeads of cellulose esters range in size from about 0.1–50 microns, and are present in an amount of about 10–30% by weight based on the weight of the polyester. The microbeads of cellulose acetate having a Tg of at least 20° C. higher than the Tg of the polyester and are hard compared to the polyester.

The microbeads of cellulose acetate are at least partially bordered by voids. The void space in the shaped article should occupy about 2–50%, preferably about 20–30%, by volume of the shaped article. Depending on the manner in which the shaped articles are made, the voids may completely encircle the microbeads, e.g., a void may be in the shape of a doughnut (or flattened doughnut) encircling a microbead, or the voids may only partially border the microbeads, e.g., a pair of voids may border a microbead on opposite sides.

The invention does not require but permits the use or addition of a plurality of organic and inorganic materials such as fillers, pigments, antiblocks, anti-stats, plasticizers, dyes, stabilizers, nucleating agents, etc. These materials may be incorporated into the matrix phases, into the dispersed phases, or may exist as separate dispersed phases.

The microvoids form on cooling without requiring nucleating agents. During stretching the voids assume characteristic shapes from the balanced biaxial orientation of paperlike films to the uniaxial orientation of microvoided/satin-like fibers. Balanced microvoids are largely circular in the plane of orientation while fiber microvoids are elongated in the direction of the fiber axis. The size of the microvoids and the ultimate physical properties depend upon the degree and balance of the orientation, temperature and rate of stretching, crystallization kinetics, the size distribution of the microbeads, and the like.

The shaped articles according to this invention are prepared by
(a) forming a mixture of molten polyester and cellulose acetate wherein the cellulose acetat is a multiplicity of microbeads uniformly dispersed throughout the polyester, the polyester being as described hereinbefore, the cellulose acetate being as described hereinbefore.
(b) forming a shaped article from the mixture by extrusion, casting or molding,
(c) orienting the article by stretching to form microbeads of cellulose acetate uniformly distributed throughout the article and voids at least partially bordering the microbeads on sides thereof in the direction, or directions of orientation.

The mixture may be formed by forming a melt of the polyester and mixing therein the cellulose acetate. The cellulose acetate may be in the form of solid or semisolid microbeads, or in molten form. Due to the incompatability between the polyester and cellulose acetate, there is no attraction or adhesives between them, allowing the cellulose acetate to "bead-up" if molten to form dispersed microbeads upon mixing. If solid or semisolid, the microbeads become uniformly dispersed in the polyester upon mixing.

When the microbeads have become uniformly dispersed in the polyester, a shaped article is formed by processes such as extrusion, casting or molding. Examples of extrusion or casting would be extruding or casting a film or sheet, and an example of molding would be injection or reheat blow-molding a bottle. Such forming methods are well known in the art. If sheets or film material are cast or extruded, it is important that such article be oriented by stretching, at least in one direction. Methods of unilaterally or bilaterally orienting sheet or film material are well known in the art. Basically, such methods comprise stretching the sheet or film at least in the machine or longitudinal direction after it is case or extruded an amount of about 1.5–10 (usually 3–4) times its original dimension. Such sheet or film may also be stretched in the transverse or cross-machine direction by apparatus and methods well known in the art, in amounts of generally 1.5–10 (usually 3–4) times the original dimension. Such appratus and methods are well known in the art and are described in such U.S. Pat. Nos. 3,903,234, incorporated herein by reference.

If the shaped article is in the form of a bottle, orientation is generally biaxial as the bottle is stretched in all directions as it is blow-molded. Such formation of bottles is also well known in the art. See, for example, U.S. Pat. No. 3,849,530, incorporated herein by reference.

The voids, or void spaces, referred to herein surrounding the microbeads are formed as the polyester continuous matrix is stretched at a temperature between the polyester Tg and the cellulose acetate Tg. The microbeads of cellulose acetate are relatively hard compared to the polyester continuous matrix. Also, due to the incompatability and immiscibility between the cellulose acetate and the polyester, the polyester continuous matrix slides over the microbeads as it is stretched, causing voids to be formed at the sides in the direction or directions of stretch, which voids elongate as the polyester matrix continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens and microvoids and orients the matrix material. The final product properties depend on and can be controlled by stretching time-temperature relationships and on the type and degree of stretch. For maximum opacity and texture, the stretching is done just above the glass transition temperature of the matrix material. When stretching is done in the neighborhood of the higher glass transition temperature, both phases stretch together and opacity decreases. In the former case, the materials are pulled apart, a mechanical anticompatibilization process, In the latter case, they are drawn together, a mechanical compatibilization process. Two examples are high-speed melt spinning of fibers and melt blowing of fibers and films to form non-woven/spun-bonded products. In summary, the scope of this invention includes the complete range of forming operations just described.

In general, void formation occurs independent of, and does not require, crystalline orientation of the matrix phase. Opaque, microvoided films have been made in accordance with the methods of this invention using completely amorphous, non-crystallizing copolyesters as the matrix phase. Crystallizable/orientable (strain hardening) matrix materials are preferred for some properties like tensile strength and barrier. On the other hand, amorphous matrix materials have special utility in other areas like tear resistance and heat sealability. The specific matrix composition can be tailored to meet many product needs. The complete range from crystalline to amorphous matrix materials is part of the invention.

Stretching experiments reveal that increasing the cellulose ester content of the blends reduces the effective natural draw ratio relative to that of the matrix material and raises the effective orientation or draw temperature. When melt casting these films, required casting roll temperature increases with cellulose ester content. Minimal cooling below the orientation temperature prior ro stretching is preferred since the cooled preform state is often brittle, the brittleness increasing with cellulose ester content. This is not a problem in blowing bottles from reheated injection-molded preforms.

Another important and useful property of these microvoided structures is the irreversible closure of the microvoids under the action of direct pressure. Although cell/void closure phenomena are not new, the films of this invention represent an improvement over the prior art. High resolution, clear light paths are created in these partially opaque, light-diffusing films when the microvoids close around the clear, cellulose ester microbeads. These closures can be accomplished before or after heat-setting and also survive the heat-setting process. The films of this invention are useful for recording information suitable for reading by light sensing devices or projecting by transmitted light. Instant slides have been made by inkless writing and typing on these films, mounting in a slide frame, and heat shrinking. When projected onto a screen with a conventional slide projector, precise, bright, white images on a soft gray background are seen. When colors are incorporated into the films, precise, bright, tinted-white images on soft tinted-gray background are seen. When these films are pressure printed with transparent colors, precise, bright, colored images are created. Use of the compositions and products of this invention for microvoided recording and projection media are the result of and part of the invention.

The following examples are submitted for a better understanding of the invention.

In the examples the specified materials were combined and mixed in a dry state prior to extrusion. Most of the materials used in these examples are granules (ground through a 2 millimeter screen) and fine powders. This form permits good dry blending without separation during processing. In most cases, the mixed materials were dried under vacuum conditions with nitrogen bleed to carry off the volatiles. Of course, when substantial amounts of low-melting materials were used, separate drying was done, followed by mixing and immediate extrusion. The relative amounts of the polyester, cellulose ester, and other materials are indicated by mass ratios; and all percents are weight %. During extrusion, the materials are melted and mixed as viscous melts. Shear emulsification of the immiscible melts was enhanced with a mixing section centrally located in the metering section of the extruder screw. Residence time was kept small by design; for example, screw L/D was 24:1 (Killion 1.25 inch extruder) and the dies were joined directly to the extruder via small-sized adaptors. The extrudate is quenched to form flat films or sheet, tubular films, rods, fibers, or bottle preforms (injection molding). The required orientaton was carried out by conventional equipment and methods associated with the specific forming operation.

EXAMPLE 1

Blends were prepared with a polyester and a cellulose acetate. The polyester is Polyester A and the cellulose ester is cellulose acetate CA-398-30. Two blends (80/20) and (90/10) were melt cast to form sheets between 15 to 20 mils thick. These sheets were simultaneously stretched 4× (a multiple of 4) in both directions to form white, paper-like films just over 1 mil thick. The films of this invention are highly diffuse reflective over the visible spectrum and remain highly reflective in the near UV (300 to 400 nanometer wavelengths) region. Typical films properties and processing conditions are given below.

EXAMPLE 2 (Control)

This example is an example of prior art. It is given here for direct comparison with Example 1. Blends were prepared with the same polyester as Example 1 and inorganic materials. The inorganics are titanium dioxide (Rutile R-100) and calcium carbonate (Microwhite 25). A (90/10) blend of the polyester and each of the inorganics was melt cast to form sheets between 15 to 20 mils thick. These sheets were simultaneously stretched 4× in both directions to form white, plastic-like films just over 1 mil thick. Typical film properties and processing comditions are given below.

EXAMPLE 3

Blends were prepared with a polyester and a cellulose acetate. The polyester is a blend of polyester A and Polyester A containing a covalently bound colorant. The cellulose acetate is CA-398-30. Two (80/20) blends (one containing 0.5% red moiety and one containing 0.5% blue moiety) were melt cast to form sheets about 20 mils thick. These sheets were simultaneously stretched 4× in both directions to form pastel-colored,

EXAMPLE 4

Blends were prepared with a polyester and a mixed cellulose ester, cellulose acetate propionate. The polyester is Polyester A and the cellulose ester is CAP-482-20. This (90/10) blend and a (90/10) blend made like Example 1 were melt cast to form sheets about 15 mils thick. These sheets were simultaneously stretched 4× in both directions to form translucent, paper-like films about 1 mil thick. Typical film properties and processing conditions are given below.

EXAMPLE 5

Blends were prepared with the same polyester and cellulose acetate as Example 1. The specific blends (95/5), (90/10), (85/15), (80/20), (75/25), and (70/30) were melt cast to form sheets about 25 mils thick. Extrusion conditions were similar to those of Example 1. These sheets were simultaneously stretched 3× in both directions to form white, paper-like films about 3 mils thick. These sheets were also simultaneously stretched 4× in both directions to form white, paper-like films about 2 mils thick. Typical film optical properties are given below.

EXAMPLE 6

This example shows that light-colored, opaque structures developed when the dispersed phase was colored. The polyester of Example 1 was mixed with a cellulose acetate (CA-320S, containing a covalently bonded colorant). A (90/10) blend (containing 0.13% red moiety) was melt cast to form sheets about 15 mils thick. These sheets were stretched as in Example 1 yielding uniformly pastel-red, opaque, paper-like films.

EXAMPLE 7

This example shows that lower viscosity polyesters containing minor amounts of additives yielded products of this invention. A blend was prepared with a polyester and a cellulose acetate. The polyester is Polyester B and the cellulose acetate is CA-398-30. A (90/10) blend was melt cast to form sheets between 15 to 20 mils thick. A Brabender ¾ inch laboratory extruder without a mixing screw was used at 110 RPM and 260° C. (melt temperature). These sheets were simultaneously stretched 4× in both directions to form white, paper-like films just over 1 mil thick. The effect of the optical brightener was visually observed to be enhanced by the highly reflective structures of this invention. These films contained visible particles of cellulose acetate resulting from the incomplete shear emulsification on this machine.

EXAMPLE 8

This example shows that white, opaque properties developed over a range of stretching conditions. A (90/10) blend of the same materials as Example 1 was melt cast using the equipment of Example 6. Stretching conditions were (2×1), (2×2), (3×1), (3×2), (3×3), (4×1), (4×2), (4×3) and (4×4). Whiteness and opacity were visually evident at all levels of stretching, increasing with balance and degree of stretch.

EXAMPLE 9

This example illustrates that polyester/polyester blends can be used with cellulose acetates to produce articles of this invention. The specific blends of this example are (65/25/10) and (65/15/20) using Polyester A, Polyester C, and CA-398-30 respectively. Films were made as in Example 1, and the resulting properties were similar. The films of this example, however, were more flexible due to the presence of the thermoplastic elastomer in the blend.

EXAMPLE 10

Blends were prepared with a polyester and a cellulose acetate. The polyester is Polyester A and the cellulose acetate is CA-394-60S. The following blends (95/5), (90/10), (85/15), and (80/20) were melt extruded and simultaneously biaxially oriented on a laboratory blown film line. The oriented tubes had a layflat width of about 9 to 12 inches, and the film thickness was about 0.5 mil. These films were white, opaque, and had tissue paper qualities. Typical film properties and processing conditions are given below.

EXAMPLE 11

Blends were prepared with a polyester and a cellulose acetate. The polyester is a blend of Polyester A and Polyester A containing a covalently bound colorant. The cellulose acetate is CA-398-30. Four (80/20) blends were melt extruded and simultaneously biaxially oriented as in Example 10. Typical film properties and processing conditions are given below.

EXAMPLE 12

A (90/10) blend were prepared with a higher glass transition polyester, Polyester D, and a cellulose acetate (CA-394-60S). This blend was melt extruded at a melt temperature of 270° C. and simultaneously biaxially oriented at about 140° C. as in Example 10. The resulting film was white, opaque, and paper-like. The quality was slightly degraded because the polyester was recycled material. This blend system is especially attractive if high temperature resistant products are being manufactured.

EXAMPLE 13

The blends of this example were prepared from a polyester, a polypropylene, and a cellulose acetate. The polyester is Polyester A; the polypropylene homopolymer is PP 4230; and the cellulose acetate is CA-394-60S. Three blends (70/10/20), (75/5/20), and (77/3/20) were melt extruded and simultaneously biaxially oriented as in Example 10. White, opaque, paper-like films were made, however film strength and quality decreased as the level of polypropylene increased.

EXAMPLE 14

A (90/10) blend was prepared with a polyester, Polyester A, and a cellulose triacetate CA-436-80S. This blend was melt extruded at a melt temperature of 275° C. and simultaneously biaxially oriented as in Example 10. White, opaque, paper-like films were made, however the quality of the film was degraded by the presence of small particles of incompletely melted cellulose triacetate.

EXAMPLE 15

Blends were prepared with a polyester, Polyester A, a water-dispersible polyester, and a cellulose acetate (CA-398-30). The blend was melt extruded and simultaneously biaxially oriented as in Example 10. The white, opaque, paper-like films were of good quality, with an enhanced hydrophilic character due to the presence of the hydrophilic polyester.

EXAMPLE 16

A (90/10) blend of an amorphous copolyester and a cellulose acetate was prepared. The copolyester was Polyester E, and the cellulose acetate was CA-394-60S. The blend was melt extruded and simultaneously biaxially oriented as in Example 10; however, the white, opaque, paper-like films had a faint, yellowish tint, indicating greater thermal degradation.

EXAMPLE 17

A (90/10) blend of another copolyester and a cellulose acetate was prepared. The copolyester was Polyester F and the cellulose acetate was CA-398-30. The blend was melt extruded and simultaneously biaxially oriented as in Example 10. A good quality, white, opaque, paper-like film resulted.

EXAMPLE 18

A (90/10) blend was prepared from a polyester, Polyester A, and a lower viscosity cellulose acetate (CA-398-3). A second (90/10) blend of this polyester with a lower % acetyl cellulose acetate (CA-320S) was also prepared. Both blends were melt extruded and simultaneously biaxially oriented as in Example 10. Good quality, white, opaque, paper-like films resulted. In addition, both blends were melt extruded as in Example 10, followed by uniaxial (machine direction) drawing in the second bubble. This procedure was used to create tubular or hollow fiber analogs. Relatively strong, white, opaque, textured-surface structures containing uniaxially drawn microvoids were observed. Fiber structures were also produced by reheating and hand-drawing strands cut from cast sheets.

EXAMPLE 19

Another (90/10) blend of polyester, Polyester A, and cellulose acetate (CA-398-30) was melt extruded on a New Britain injection-molding machine to made standard 55 gram preforms (parisons) for 2-liter oriented polyester beverage bottles. The preforms were reheated and blown at a manual blowing station to produce white, opaque, textured, oriented botles. The surface of these bottles was noticeably rough when compared with the films and fibers. This was a result of the poor mixing conditions in the injection-molding machine, a cyclic opertion without a mixing screw.

EXAMPLE 1
TYPICAL CAST & TENTERED FILM PROPERTIES FOR 80/20 & 90/10 POLYESTER/CELLULOSE ACETATE

| Material | (80) Polyester A (20) CA-398-30 | (90) Polyester A (10) CA-398-30 |
|---|---|---|
| Melt Temp., °C. | 260 | 262 |
| Screw Speed (rpm) | 50 | 50 |
| Cast Roll Temp., °C. | 82 | 58 |
| Cast Roll Speed (fpm) | 6.0 | — |
| Stretch Temp., °C. | 120 | 110 |
| Film Thickness (mil) | 1.37 | 1.17 |
| Inherent Visc. (dl/g) | 0.590 | 0.623 |
| Density (g/cc) | 1.023 | 1.303 |
| Tensile Yield ($10^3$ psi) | 7.40/6.67 | 12.8/12.6 |
| Tensile Break ($10^3$ psi) | 10.4/8.74 | 23.5/22.4 |
| Elongation to Break (%) | 70/61 | 92/77 |
| Oxygen Transmission (cc-mil/100 in$^2$ hr-atm) | 16.0 | 9.54 |
| Kubelka-Munk Analysis (560 nm): | | |
| Scattering SX | 3.644 | 2.308 |
| Absorption KX | 0.002x | 0.002x |
| Transmittance T(i) | 0.214 | 0.302 |
| Reflectance R(inf) | 0.966 | 0.966 |
| Opacity | 0.812 | 0.722 |

EXAMPLE 2
CAST & TENTERED FILM PROPERTIES FOR 90/10 POLYESTER/INORGANIC FILLER

| Material | (90) Polyester A (10) Rutile R-100 | (90) Polyester A (10) Microwhite 25 |
|---|---|---|
| Melt Temp., °C. | 263 | 263 |
| Screw Speed (rpm) | 50 | 50 |
| Cast Roll Temp., °C. | 42 | 50 |
| Cast Roll Speed (fpm) | — | — |
| Stretch Temp., °C. | 110 | 110 |
| Film Thickness (mil) | 1.13 | 1.33 |
| Inherent Visc. (dl/g) | 0.563 | 0.573 |
| Density (g/cc) | 1.432 | 1.323 |
| Tensile Yield ($10^3$ psi) | 11.3/12.0 | 10.8/11.2 |
| Tensile Break ($10^3$ psi) | 18.6/20.3 | 16.5/17.7 |
| Elongation to Break (%) | 103/100 | 73/71 |
| Oxygen Transmission (cc-mil/100 in$^2$ hr-atm) | 8.72 | 10.2 |
| Kubelka-Munk Analysis (560 nm): | | |
| Scattering SX | 2.310 | 1.115 |
| Absorption KX | 0.005x | 0.008x |
| Transmittance T(i) | 0.300 | 0.468 |
| Reflectance R(inf) | 0.936 | 0.886 |
| Opacity | 0.742 | 0.591 |

EXAMPLE 3
FOR 75/5/20 POLYESTER/RED POLYESTER/CELLULOSE ACETATE 75/5/20 POLYESTER/BLUE POLYESTER/CELLULOSE ACETATE

| Material | (75) Polyester A (5) Polyester A (Red) (20) CA-398-30 | (75) Polyester A (5) Polyester A (Blue) (20) CA-398-30 |
|---|---|---|
| Melt Temp., °C. | 260 | 260 |
| Screw Speed (rpm) | 50 | 50 |
| Cast Roll Temp., °C. | 82 | 82 |
| Cast Roll Speed (fpm) | 6.0 | 6.0 |
| Stretch Temp., °C. | 120 | 125 |
| Film Thickness (mil) | 1.78 | 1.75 |
| Inherent Visc. (dl/g) | 0.640 | 0.672 |
| Density (g/cc) | 0.889 | 0.895 |
| Tensile Yield ($10^3$ psi) | 6.19/6.00 | 4.97/4.92 |
| Tensile Break ($10^3$ psi) | 8.10/7.75 | 5.78/5.38 |
| Elongation to Break (%) | 50/42 | 41/23 |
| Oxygen Transmission (cc-mil/100 in$^2$ hr-atm) | 18.4 | 21.8 |
| Kubelka-Munk Analysis (560 nm): | | |

-continued

EXAMPLE 3
FOR 75/5/20 POLYESTER/RED POLYESTER/CELLULOSE ACETATE
75/5/20 POLYESTER/BLUE POLYESTER/CELLULOSE ACETATE

| | | |
|---|---|---|
| Scattering SX | 5.571 | 6.530 |
| Absorption KX | 2.332x | 2.408x |
| Transmittance T(i) | 0.003 | 0.000 |
| Reflectance R(inf) | 0.413 | 0.434 |
| Opacity | 1.000 | 1.000 |

EXAMPLE 4
CAST & TENTERED FILM PROPERTIES
FOR 90/10 POLYESTER/CELLULOSE ACETATE AND
90/10 POLYESTER/CELLULOSE ACETATE PROPIONATE

| Material | (90) Polyester A (10) CA-398-30 | (90) Polyester A (10) CAP-482-20 |
|---|---|---|
| Melt Temp., °C. | 264 | 264 |
| Screw Speed (rpm) | 50 | 50 |
| Cast Roll Temp., °C. | 49 | 49 |
| Cast Roll Speed (fpm) | 6.0 | 6.0 |
| Stretch Temp., °C. | 105 | 115 |
| Film Thickness (mil) | 1.03 | 0.94 |
| Inherent Visc. (dl/g) | 0.603 | 0.665 |
| Density (g/cc) | 1.192 | 1.364 |
| Tensile Yield ($10^3$ psi) | 13.5/13.7 | 15.9/15.1 |
| Tensile Break ($10^3$ psi) | 25.5/25.9 | 29.0/29.2 |
| Elongation to Break (%) | 84/78 | 103/108 |
| Oxygen Transmission (cc-mil/100 in² hr-atm) | 8.01 | 7.34 |
| Kubelka-Munk Analysis (560 nm): | | |
| Scattering SX | 2.397 | 0.398 |
| Absorption KX | 0.006x | 0.006x |
| Transmittance T(i) | 0.292 | 0.711 |
| Reflectance R(inf) | 0.930 | 0.848 |
| Opacity | 0.756 | 0.334 |

EXAMPLE 5
KUBELKA-MUNK ANALYSES

| Polyester/Cellulose Acetate (Mass Ratio) | Stretch Ratios (X × Y) | Stretch Temp., °C. | Reheat Time (Sec) | Thickness (Mils) | SX | KX | T(i) | Roo | Opacity |
|---|---|---|---|---|---|---|---|---|---|
| 99/1 | 3 × 3 | 100 | 45 | 2.7 | 0.201 | 0.012X | 0.822 | 0.710 | 0.233 |
| 98/2 | 3 × 3 | 100 | 45 | 2.8 | 0.272 | 0.014X | 0.775 | 0.730 | 0.289 |
| 95/5 | 3 × 3 | 100 | 60 | 2.9 | 0.861 | 0.013X | 0.529 | 0.838 | 0.545 |
| 90/10 | 3 × 3 | 100 | 75 | 3.2 | 2.611 | 0.014X | 0.271 | 0.901 | 0.794 |
| 85/15 | 3 × 3 | 100 | 75 | 3.7 | 6.484 | 0.015X | 0.128 | 0.933 | 0.917 |
| 80/20 | 3 × 3 | 100 | 75 | 4.0 | 11.892 | 0.013X | 0.073 | 0.954 | 0.958 |
| 75/25 | 3 × 3 | 100 | 60 | 3.4 | 12.126 | 0.016X | 0.071 | 0.950 | 0.961 |
| 70/30 | 3 × 3 | 110 | 75 | 5.2 | 19.160 | 0.015X | 0.045 | 0.961 | 0.978 |
| 75/25 | 3.5 × 3.5 | 115 | 60 | 2.7 | 7.262 | 0.012X | 0.117 | 0.945 | 0.922 |
| 70/30 | 3.5 × 3.5 | 115 | 60 | 5.0 | 21.990 | 0.012X | 0.040 | 0.967 | 0.980 |
| 99/1 | 4 × 4 | 110 | 60 | 1.6 | 0.195 | 0.011X | 0.828 | 0.719 | 0.224 |
| 98/2 | 4 × 4 | 110 | 60 | 1.6 | 0.260 | 0.011X | 0.785 | 0.749 | 0.273 |
| 95/5 | 4 × 4 | 110 | 60 | 1.8 | 0.745 | 0.010X | 0.567 | 0.851 | 0.497 |
| 90/10 | 4 × 4 | 110 | 60 | 2.1 | 2.583 | 0.010X | 0.274 | 0.914 | 0.782 |
| 85/15 | 4 × 4 | 115 | 60 | 2.0 | 4.076 | 0.009X | 0.193 | 0.937 | 0.851 |
| 80/20 | 4 × 4 | 115 | 45 | 2.7 | 9.699 | 0.011X | 0.090 | 0.954 | 0.943 |
| 70/30 | 4 × 4 | 120 | 120 | 5.8 | 22.634 | 0.015X | 0.037 | 0.964 | 0.983 |

EXAMPLE 10
BLOWN FILM PROPERTIES

| Material or Blend | (95) Polyester A (5) CA-394-60S | (90) Polyester A (10) CA-394-60S | (85) Polyester A (15) CA-394-60S | (80) Polyester A (20) CA-394-60S |
|---|---|---|---|---|
| Extruder Melt Temp., °C. | 255 | 254 | 260 | 260 |
| Extruder Pressure (psig) | 1400 | 1400 | 1500 | 1400 |
| Extruder Screw (rpm) | 40 | 40 | 50 | 50 |
| NIP Speed (ft/min) | 46 | 46 | 43 | 51 |
| Film Thickness (mil) | 0.49 | 0.49 | 0.59 | 0.48 |
| Area Weight (grams/sq ft) | 1.71 | 1.60 | 2.01 | 1.27 |
| Density (sp.gr.) | 1.301 | 1.302 | 1.208 | 1.120 |
| Yield Stress ($10^3$ psi) (MD/TD) | 8.6/7.6 | 7.8/5.9 | 5.3/7.4 | 5.1/6.4 |

EXAMPLE 11
BLOWN FILM PROPERTIES

| Material or Blend | (80) Polyester A | (75) Polyester A | (75) Polyester A | (80) Polyester A |
|---|---|---|---|---|

EXAMPLE 11
BLOWN FILM PROPERTIES

| | (20) CA-398-30 | (5) Polyester A (Yellow) (20) CA-398-30 | (5) Polyester A (Red) (20) CA-398-30 | (5) Polyester A (Blue) (20) CA-398-30 |
|---|---|---|---|---|
| Extruder Melt Temp., °C. | 255 | 255 | 256 | 257 |
| Extruder Pressure (psig) | 1400 | 1400 | 1400 | 1400 |
| Extruder Screw (rpm) | 50 | 50 | 50 | 50 |
| NIP Speed (ft/min) | 51 | 51 | 51 | 51 |
| Film Thickness (mil) | 0.60 | 0.53 | 0.49 | 0.48 |
| Area Weight (grams/sq ft) | 1.84 | 1.57 | 1.53 | 1.44 |
| Inherent Viscosity (dl/gm) | 0.629 | 0.650 | 0.660 | 0.657 |
| Density (sp.gr.) | 1.143 | 1.143 | 1.109 | 1.117 |
| Yield Stress ($10^3$ psi) (MD/TD) | 8.8/7.2 | 9.1/8.2 | 8.1/7.6 | 8.0/7.6 |
| Oxygen Transmission (cc-mil/100 in$^2$-24 hr-atm) | 11.5 | 12.2 | 11.7 | 11.8 |

| | |
|---|---|
| Polyester A is described as follows: | |
| Reaction Product Of: | |
| Dicarboxylic acid(s) or Ester Thereof | dimethyl terephthalate |
| Glycol(s) | ethylene glycol |
| I.V. | 0.70 |
| Tg | about 80° C. |
| Tm | about 255° C. |
| Polyester B is described as follows: | |
| Reaction Product Of: | |
| Dicarboxylic acid(s) or Ester Thereof | dimethyl terephthalate |
| Glycol(s) | ethylene glycol |
| I.V. | 0.64 |
| Tg | about 80° C. |
| Tm | about 255° C. |
| Polyester C is described as follows: | |
| Reaction Product Of: | |
| Dicarboxylic acid(s) or Ester Thereof | 99.5 mol % 1,4-cyclohexanedicarboxylic acid 0.5 mol % trimellatic anhydride |
| Glycol(s) | 91.1 mol % 1,4-cyclohexanedimethanol 8.9 mol % poly(tetramethylene ether glycol) |
| I.V. | 1.05 |
| Tg | below 0° C. |
| Tm | about 120° C. |
| Polyester D is described as follows: | |
| Reaction Product Of: | |
| Dicarboxylic acid(s) or Ester Thereof | Naphthalene dicarboxylic acid |
| Glycol(s) | ethylene glycol |
| I.V. | 0.80 |
| Tg | 125° C. |
| Tm | 265° C. |
| Polyester E is described as follows: | |
| Reaction Product Of: | |
| Dicarboxylic acid(s) or Ester Thereof | terephthalic acid |
| Glycol(s) | 69 mol % ethylene glycol 31 mol % 1,4-cyclohexanedimethanol |
| I.V. | 0.75 |
| Tg | about 80° C. |
| Tm | amorphous |
| Polyester F is described as follows: | |
| Reaction Product Of: | |
| Dicarboxylic acid(s) or Ester Thereof | 75 mol % terephthalic acid 25 mol % trans-4,4'-stilbene dicarboxylic acid |
| Glycol(s) | ethylene glycol |
| I.V. | about 0.8 |
| Tg | 95° C. |
| Tm | −215° C. |

The cellulose acetates, designated as "CA" are as defined in the table above.

Where ratios or parts are given, e.g., 80/20, they are parts by weight, with the polyester weight specified first.

The following applies to Kubelka-Munk values:
SX is the scattering coefficient of the whole thickness of the article and is determined as follows:

$$SX = \frac{1}{b}\left( Ar\, ctgh\, \frac{a-R}{b} - Ar\, ctgh\, \frac{a-Rg}{b} \right)$$

wherein:
$b = (a^2 - 1)^{\frac{1}{2}}$
Ar ctgh is the inverse hyperbolic cotangent $$a = \frac{1}{2}\left( R + \frac{Ro - R + Rg}{RoRg} \right)$$

Ro is reflectance with black tile behind sheet
R is reflectance with white tile behind sheet
Rg is reflectance of a white tile = 0.89
KX is the absorption coefficient of the whole thickness of the article and is determined as follows:

$$KX = SX(a-1)$$

wherein SX and a are as defined above
R (infinity) is the reflectance of an article if the article was so thick that additional thickness would not change it and is determined as follows:

$$R(infinity) = a - (a^2 - 1)^{\frac{1}{2}}$$

wherein a is as defined above

Ti is the internal light transmittance and is determined as follows:

$$Ti = [(a-Ro)^2 - b^2]^{\frac{1}{2}}$$

$$\text{Opacity} = \frac{Ro}{Rg}$$

wherein Ro and Rg are as defined above.

In the above formulae, Ro, R and Rg are determined in a conventional manner using a Diano Match-Scan II Spectrophotometer (Milton Roy Co.) using a wavelength of 560 nanometers. Also above, X in the formulae SX and KX is the thickness of the article. A full description of these terms is found in Colors in "Business, Science and Industry" 3rd Edition, by Deane B. Judd & Gunter Wyszecki, published by John Wiley & Sons, N.Y. (1975), pages 397–439, which is incorporated herein by reference.

Glass transition temperatures, Tg and melt temperatures, Tm, are determined using a Perkin-Elmer DSC-2 Differential Scanning Calorimeter.

In the examples, physical properties are measured as follows:
Tensile Strength at Yield — ASTM D882
Tensile Strength at Break — ASTM D882
Elongation at Break — ASTM D882

Unless otherwise specified inherent viscosity is measured in a 60/40 parts by weight solution of phenol-tetrachloroethane 25° C. and at a concentration of about 0.5 gram of polymer in 100 ml of the solvent.

Where acids are specified herein in the formation of the polyesters or copolyesters, it should be understood that ester forming derivatives of the acids may be used rather than the acids themselves as is conventional practice. For example, dimethyl isophthalate may be used rather than iosphthalic acid.

In the exmaples, oxygen permeability is determined according to ASTM D3985, in cubic centimeters permeating a 1 mil thick sample, 100 inches square, for a 24-hour period under oxygen partial pressure difference of one atmosphere at 30° C. using a MOCON Oxtran 10-50 instrument. Oxygen permeability is also given in S.I. (Systems International) units in cubic centimeters permeating a 1 cm. thick sample, 1 cm. square, for 1 second at atmospheric pressure.

Unless otherwise specified, all parts, ratios, percentages, etc. are by weight.

The invention has been described in detail with particular reference to preferred embodiments theeof, but it will be understood that variations and modifications can be effected within the spirit and scope of the invention.

We claim:

1. The method of forming a shaped article having at least one major surface comprising a continuous phase of polyester having dispersed therein microbeads of cellulose acetate at least partially bordered by void space oriented generally flatwise with respect to said major surface of said shaped article, said sheet when consisting only of said polyester continuous phase and said microbeads at least partially bordered by void space characterized by having a Kubelka-Munk R value (infinite thickness) of about 0.90 to about 1.0 and the following Kubelka-Munk values when formed into a 3 mil thick film:
    Opacity — about 0.78 to about 1.0
    SX — 25 or less
    KX — about 0.001 to 0.2
    T(i) — about 0.02 to 1.0
said method comprising
    (a) forming a mixture of molten polyester and cellulose acetate, wherein the cellulose acetate is a multiplicity of uniformly dispersed microbeads throughout said polyester, said polyester having an I.V. of at least 0.55, said cellulose acetate having an acetyl content of about 28 to 44.8% by weight, a viscosity of about 0.01–90 seconds and a Tg of about 20° C. higher than the Tg of said polyester,
    (b) forming a shaped article from said mixture,
    (c) orienting said article by stretching at least in one direction to form microbeads of said cellulose acetate uniformly distributed throughout said article and voids at least partially bordering said microbeads on sides thereof in the direction(s) of orientation.

2. The method according to claim 1 wherein said shaped article is selected from the group consisting of sheets, fibers and rods and is oriented by stretching in one direction.

3. The method according to claim 1 wherein said shaped article is a sheet and is oriented by stretching in two directions.

4. The method according to claim 1 wherein said shaped article is a bottle and is biaxially oriented by blow-molding.

5. The method according to claim 1 wherein said polyester is poly(ethylene terephthalate).

6. The method of forming a paper-like sheet comprising a continuous phase of polyester having dispersed therein microbeads of cellulose acetate encircled by void spaces when viewed in a direction perpendicular to the plane of the sheet, said sheet when consisting only of said polyester continuous phase and said microbeads at least partially bordered by void space characterized by having a Kubelka-Munk R value (infinite thickness) of about 0.90 to about 1.0 and the following Kubelka-Munk values when formed into a 3 mil thick film:
    Opacity — about 0.78 to 1.0
    SX — 25 or less
    KX — about 0.001 to 0.2
    T(i) — about 0.02 to 1.0
said method comprising
    (a) forming a molten mixture of poly(ethylene terephthalate) and cellulose acetate, wherein the cellulose acetate is uniformly dispersed through said poly(ethylene terephthalate); said poly(ethylene terephthalate) having a Tg of about 80° C., and an I.V. of at least 0.55, said cellulose acetate having an acetyle content of about 28 to 44.8% by weight, a viscosity of about 0.01–90 seconds and a Tg of about 20° C. higher than the Tg of said poly(ethylene terephthalate),
    (b) casting a film of said mixture, and
    (c) orienting said film by stretching to form microbeads of said cellulose acetate uniformly distributed throughout said film and encircled by doughnut-shaped voids lying in planes generally parallel to opposite surfaces of said film.

* * * * *